March 14, 1961 D. L. WHEELER 2,974,537

TAPE TRANSPORT MECHANISM

Filed May 22, 1959

2 Sheets-Sheet 1

INVENTOR.
DAVID L. WHEELER
BY
Porter, Chittick & Russell
ATTORNEYS

March 14, 1961 D. L. WHEELER 2,974,537

TAPE TRANSPORT MECHANISM

Filed May 22, 1959 2 Sheets-Sheet 2

INVENTOR.
DAVID L. WHEELER
BY
Porter, Chittick & Russell
ATTORNEYS 2,974,537
Patented Mar. 14, 1961

2,974,537

TAPE TRANSPORT MECHANISM

David L. Wheeler, Rockport, Mass.
(35 Library St., Georgetown, Mass.)

Filed May 22, 1959, Ser. No. 815,135
10 Claims. (Cl. 74—220)

This invention relates to reversible drive mechanisms and more particularly to a mechanism for reversibly driving the tape transport capstan of a tape recorder.

The primary object of this invention is to provide a new mechanism for reversibly driving a capstan from a unidirectional electric motor, which mechanism is simple and easy to manufacture and assemble.

Other objects and many of the attendant advantages of this invention will be readily appreciated as the same becomes better understood by reference to the following detailed description when considered in connection with the accompanying drawings, wherein.

Figures 1, 2:
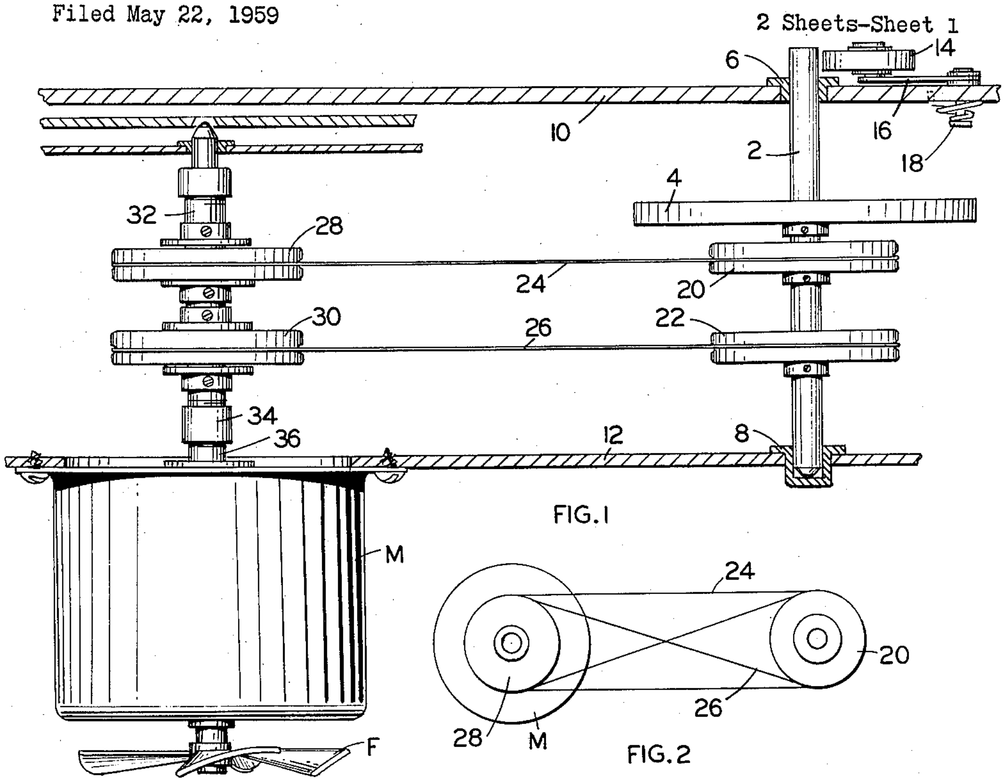
Fig. 1 is a side view in elevation of a capstan drive system embodying the present invention.
Fig. 2 is a plan sectional view showing the arrangement of the capstan drive belts.
Figure 4:
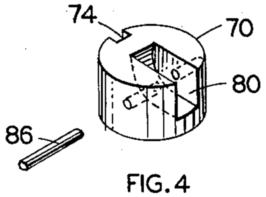
Fig. 4 is a perspective view of one of the elements shown in Fig. 3.
Figure 5:
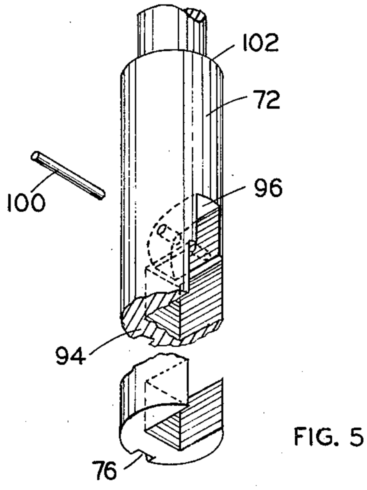
Fig. 5 is a perspective view of another of the elements shown in Fig. 3.

Referring now to Fig. 1, there is shown a recording tape drive capstan 2 provided with a flywheel 4 to minimize variations in its angular speed. The capstan is journaled by bearings 6 and 8 secured to suitable supports, as, for example, fixed horizontal floor members 10 and 12. The top end of the capstan extends above the top floor member 10 and is the portion of the capstan which actually drives the recording tape. The tape is pressed selectively against the capstan by a suitable pinch roller 14 which is carried by a lever 16 pivotally secured to floor member 10. A suitable spring 18 urges lever 16 with roller 14 toward the capstan.

Capstan 2 also supports two pulleys 20 and 22 which are engaged and driven by belts 24 and 26 respectively. Belt 26 is crossed as shown. These belts are driven by pulleys 28 and 30 which are mounted on and driven alternately by a shaft 32 which is connected by a coupling 34 to the output shaft 36 of a unidirectional electric motor M equipped with a cooling fan F.

Figure 3:
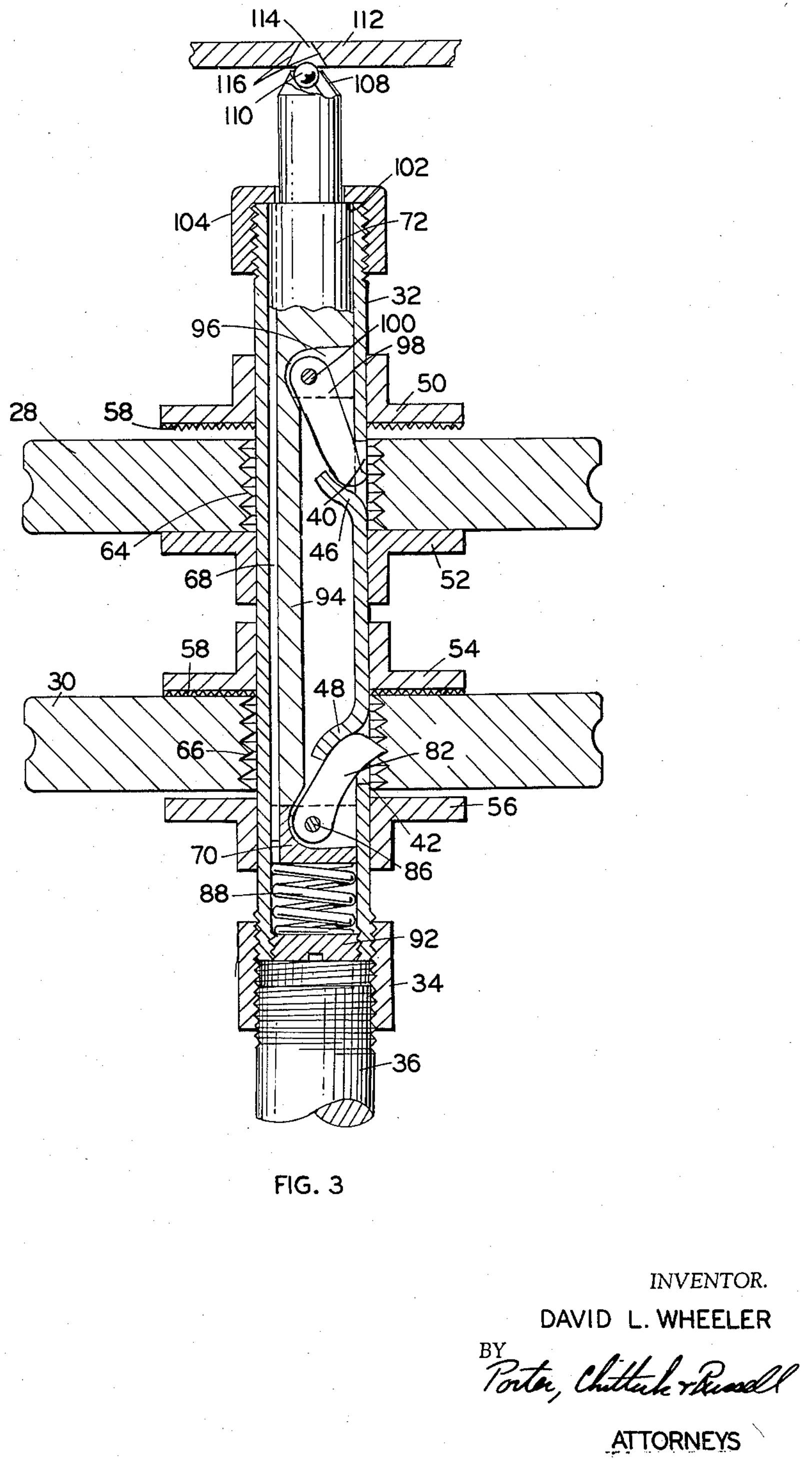
Fig. 3 is a sectional view of the drive shaft and pulley assembly.

Referring now to Fig. 3, shaft 32 is hollow and is provided with two aligned, axially shaped openings 40 and 42 which are formed by bending inwardly tongues 46 and 48 formed by making U-shaped slits in the shaft. Tongues 46 and 48 extend in opposite directions but are inclined as shown. Secured to the shaft above and below opening 40 are two annular plates 50 and 52. Two corresponding plates 54 and 56 are secured to the shaft above and below opening 42. The lower faces of plates 50 and 54 are covered with an abrasive coating 58 that functions as a brake surface for pulleys 28 and 30 which are mounted on shaft 32. Pulleys 28 and 30 are rotatable on shaft 32 and are provided with internal threads 64 and 66 respectively at their central openings.

Shaft 32 is provided with an internal key 68. Slidably positioned inside of shaft 32 are two members 70 and 72 provided with keyways 74 and 76 respectively which cooperate with key 68 to prevent rotation relative to shaft 32. The bottommost member 70 is slotted as at 80. It carries a pawl 82 whose bottom end is pivotally secured in slot 80 by a pin 86. Member 70 is urged upwardly by a spring 88 which acts against a plug 92 screwed into the bottom end of shaft 32.

A substantial portion of upper member 72 is cut away to provide a U-shaped portion 94 whose bottom end rests on bottom member 70. Above portion 94, member 72 is slotted as at 96 to accommodate a second pawl 98 which is pivotally secured by a pin 100. The top end of member 72 projects out of the upper end of shaft 32 and is of a reduced diameter so as to form a shoulder 102. Shaft 32 is fitted with a perforated cap 104 which acts as a stop for shoulder 102 to limit upward movement of members 70 and 72. The undercut portion of member 72 is tapered as at 108, and a ball bearing 110 is rotatably secured to its tip. Located above this tapered end is a slide 112 provided with a rectangular opening 114. Two opposite ones of the surfaces forming this opening are beveled as shown at 116 so as to function as a cam on ball bearing 110.

Operation of the above-described mechanism is as follows:

Assuming that slide 112 is in the position shown in Figs. 1 and 3, when motor M is energized, shaft 32 will start turning, and for a very short interval, both pulleys 28 and 30 will be stationary. This interval is the time required for pawl 82 to screw pulley 30 into contact with the brake surface 58 on annular plate 54. As soon as this occurs, pulley 30 starts to rotate with shaft 32 and drives belt 26 which in turn drives capstan 2 in a first direction.

Capstan 2 will continue to rotate in the same direction until slide 112 is shifted into engagement with ball bearing 110. When this occurs, members 70 and 72 are cammed downward relative to shaft 32. This causes pawl 82 to be retracted out of engagement with threads 66 and pawl 98 to be extended. Retraction of pawl 82 disconnects pulley 30 from shaft 32, whereupon capstan 2 becomes a free-wheeling member. It is a free-wheeling member for a very short period. Pawl 98 engages threads 64 and screws pulley 28 into engagement with the brake surface on annular plate 50, whereupon pulley 28 begins to turn with shaft 32. This in turn causes belt 24 to urge capstan 2 in a reverse direction. The capstan rapidly slows down to zero and then accelerates rapidly in said reverse direction.

The capstan will continue in this reverse direction as long as slide 112 exerts a downward force on member 72. When slide 112 is restored to the position shown in Figs. 1 and 3, spring 88 will push member 70 upward, causing tongue 48 to cam pawl 82 into engagement with threads 66. This will cause pulley 30 to be screwed up against plate 54, whereupon it will start rotating with shaft 32. Upward movement of member 70 will be accompanied by upward movement of member 72 and retraction of pawl 98. In its illustrated position, pawl 98 is prevented from re-engaging thread 64. It is prevented from doing so by its engagement with the inside surface of shaft 32 at the upper edge of opening 40. The lower edge of opening 42 blocks re-entry of pawl 82 in the same manner when member 70 is held down by operation of slide 112. Tongue 46 acts to cam pawl 98 into engagement with threads 64 on downward movement of members 70 and 72 in the same way that tongue 48 cams pawl 82 into engagement with threads 66 on upward movement of members 70 and 72. The centrifugal force which is generated is of sufficient magnitude to help keep the pawls in engagement with threads 64 and 66 on the inside surfaces of the pulleys, as the case may be, but not so strong as to prevent retraction or extension of the pawls by movement of members 70 and 72 in response to operation of slide 112 or the action of spring 88.

In operating the foregoing mechanism, negigible or no shock is experienced by capstan 2 or shaft 32 or the elements supported thereby. This is due to the braking effect that results when the pulleys 28 and 30 are screwed by pawls 98 and 82 against the abrasive surfaces 58 and also to belt slippage.

It is to be noted that pulleys 20 and 22 are not essential to the present invention. If desired, belts 24 and 26 may be mounted on flywheel 4 with the periphery of the latter functioning as both pulleys 20 and 22. Of course, flywheel 4 would be made wide enough and located so as to carry both belts. As a second alternative, an intermediate shaft may be reversibly driven by belts 24 and 26 with capstan 2 driven from the intermediate shaft by a single belt.

The foregoing mechanism has several advantages, chief of which are (1) simplicity of construction and (2) ease of assembly. In addition, it occupies little space, is readily adaptable to conventional tape recorders, and the reversing slide may be operated either manually or automatically.

Obviously, many modifications and variations of this invention are possible in the light of the foregoing teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. The combination comprising an electric motor having an output shaft which is driven only in one direction by said motor, a hollow shaft coupled to and driven by said output shaft, first and second pulleys rotatably mounted on said shaft, means limiting axial movement of said pulleys, first and second openings in said hollow shaft, first locking means in said hollow shaft movable into locking engagement with said first pulley whereby said first pulley will rotate with said hollow shaft, second locking means in said hollow shaft movable into locking engagement with said second pulley whereby said second pulley will rotate with said hollow shaft, means normally holding said first locking means out of engagement with said first pulley and said second locking means in engagement with said second pulley, and means for moving said first locking means into engagement with said first pulley and for moving said second locking means out of engagement with said second pulley, a capstan, means rotatably supporting said capstan, third and fourth pulleys on said capstan, a first endless belt mounted on and connecting said first pulley and said third pulley, and a second endless belt mounted on and connecting said second pulley and said fourth pulley, said second belt having a cross-over loop.

2. Apparatus comprising a capstan, means supporting said capstan for rotation, a hollow shaft provided with a pair of openings in its peripheral surface, drive means for unidirectionally rotating said shaft, a pair of pawls mounted in said shaft, one of said pawls normally projecting out of one of said openings and the other of said pawls normally wholly within said shaft, means for moving said one pawl wholly into said shaft and for simultaneously moving said other pawl into the other of said openings so as to project out of said shaft, two pulleys rotatably mounted on said shaft each in alignment with a different one of said openings, each pulley having a screw thread on its interior edge with which said pawls may make positive engagement to drive said pulleys, a first belt connecting one pulley with said capstan for driving said capstan in the same direction as said one pulley, and a second belt connecting said other pulley with said capstan for driving said capstan in the direction opposite to that of said other pulley.

3. In combination with a unidirectional electric motor having an output shaft driven by said motor, first and second shafts, said first shaft being hollow, means coupling said output and said first shafts for unidirectionally driving said first shaft from said output shaft, first and second pulleys rotatably supported on said first shaft, third and fourth pulleys affixed to said second shaft, a first belt connecting said first and third pulleys and a second belt connecting said second and fourth pulleys, said first and second belts arranged to travel around said third and fourth pulleys in opposite directions while traveling in the same direction around said first and second pulleys, first means within said first shaft for locking said first pulley to said first shaft for rotation therewith, second means within said first shaft for locking said second pulley to said first shaft for rotation therewith, and means for selectively and alternatively operating said first and second means during uniderectional rotation of said first shaft.

4. Apparatus comprising a hollow shaft having two axially spaced openings in its side wall, two pulleys each individually rotatably mounted on and axially movable on said shaft, means locating said pulleys in radial alignment with said openings, a pair of brake surfaces radially mounted on said shaft, first means within said shaft moveable through one of said openings to engage and shift one of said pulleys into engagement with one of said brake surfaces, and second means within said shaft moveable through the other of said openings to engage and shift the other of said pulleys into engagement with the other of said brake surfaces.

5. Apparatus as defined by claim 4 further including means for operating said first and second means alternatively.

6. Apparatus comprising a hollow shaft having two axially spaced openings in its side wall, a pair of pulleys rotatably mounted on said shaft, means locating said pulleys in radial alignment with said openings, each pulley having a screw thread on its interior edge, first means within said shaft movable through one of said openings to engage and lock with the screw thread on one of said pulleys, and second means within said shaft movable through the other of said openings to engage and lock with the screw thread on the other of said pulleys.

7. Apparatus as defined by claim 6 wherein said first and second means are a pair of pawls which are pivotally mounted within said shaft.

8. Apparatus as defined by claim 6 wherein said screw threads run in the same direction.

9. Apparatus as defined by claim 6 wherein said first and second means are pawls, and further including a member slidably located within said hollow shaft, and means pivotally securing one of said pawls to said slidable member.

10. Apparatus as defined by claim 9 wherein said slidable member projects out of one end of said hollow shaft, and further including means engageable with said slidable member outside of said hollow shaft for moving said slidable member in one axial direction relative to said hollow shaft, and means within said hollow shaft urging said slidable member in an opposite axial direction relative to said hollow shaft.

References Cited in the file of this patent

UNITED STATES PATENTS

| | | |
|---|---|---|
| 789,198 | Ambler | May 9, 1905 |
| 1,393,693 | Otti | Oct. 11, 1921 |
| 1,869,436 | Pederson | Aug. 2, 1932 |
| 2,004,750 | Eckhard | June 11, 1935 |
| 2,441,926 | Zahn et al. | May 18, 1948 |
| 2,842,005 | Dunnihoo | July 8, 1958 |